(12) United States Patent
Wang (10) Patent No.: US 11,794,981 B2
(45) Date of Patent: Oct. 24, 2023

(54) RECYCLABLE, ENERGY-SAVING AND ENVIRONMENTAL-FRIENDLY PACKING BOX APPLICABLE TO PACKAGING VARIOUS OBJECTS

(71) Applicant: Zhenkun Wang, Marblehead, MA (US)

(72) Inventor: Zhenkun Wang, Marblehead, MA (US)

( * ) Notice: Subject to any disclaimer, the term of this patent is extended or adjusted under 35 U.S.C. 154(b) by 327 days.

(21) Appl. No.: 17/215,783

(22) Filed: Mar. 29, 2021

(65) Prior Publication Data
US 2022/0153498 A1      May 19, 2022

(30) Foreign Application Priority Data
Nov. 13, 2020    (CN) .......................... 202022638184.8

(51) Int. Cl.
*B65D 81/05*      (2006.01)
*G05D 16/20*      (2006.01)
*B65D 6/18*       (2006.01)

(52) U.S. Cl.
CPC ........ *B65D 81/052* (2013.01); *B65D 11/1833* (2013.01); *G05D 16/2066* (2013.01); *Y10T 137/36* (2015.04)

(58) Field of Classification Search
CPC .............. B65D 81/052; B65D 11/1833; G05D 16/2066; Y10T 137/36
USPC ....................................................... 137/224
See application file for complete search history.

(56) References Cited

U.S. PATENT DOCUMENTS

| | | | | |
|---|---|---|---|---|
| 4,146,070 A * | 3/1979 | Angarola | ............. | B65D 81/052 417/179 |
| 5,624,035 A * | 4/1997 | Kim | ..................... | B65D 81/052 206/592 |
| 5,819,942 A * | 10/1998 | Sadow | ...................... | H05F 3/00 383/3 |
| 6,375,009 B1 * | 4/2002 | Lee | ...................... | A45C 13/021 206/522 |
| 7,106,202 B2 * | 9/2006 | Dickinson | .............. | B65D 33/25 383/61.3 |
| 8,319,630 B1 * | 11/2012 | Salwan | .................. | A45C 15/06 383/61.3 |
| 10,137,986 B1 * | 11/2018 | Bar-Zeev | ............... | B65D 81/03 |

(Continued)

FOREIGN PATENT DOCUMENTS

WO    WO-2019119532 A1 *  6/2019   ......... B65D 11/1873

OTHER PUBLICATIONS

Machine translation of WO-2019119532-A1, 2019, WO (Year: 2019).*

*Primary Examiner* — William M McCalister
(74) *Attorney, Agent, or Firm* — WPAT, PC (57) ABSTRACT

A packing box is provided. The packing box is formed by several splicing materials of a standard model. The splicing material on the top of the packing box is provided with an air pump with automatic pumping and the pressure monitoring functions. The inner side of each splicing material is provided with an air bag, and the air bags are inflatable and connected to one another via connection tubes. The air bags are able to be spliced or separated with one another, and the shape of each air bag is subject to the outline dimension of a packaged object when the air bags are inflated. The size and shape of the packing box can be determined according to the size and shape of the packaged object, so is applicable to the objects with any sizes and shapes. The packing box does not need additional fillers and is recyclable.

9 Claims, 10 Drawing Sheets

(56) References Cited

U.S. PATENT DOCUMENTS

| | | | |
|---|---|---|---|
| 10,233,005 B1* | 3/2019 | De Bonet | B65D 81/052 |
| 11,401,069 B1* | 8/2022 | Xu | B65B 55/20 |
| 2003/0062405 A1* | 4/2003 | Luu | B65D 33/1691 |
| | | | 53/458 |
| 2006/0207849 A1* | 9/2006 | Sadow | A45C 7/0081 |
| | | | 383/3 |
| 2010/0303387 A1* | 12/2010 | Dahlquist | B65D 81/022 |
| | | | 383/3 |
| 2014/0224699 A1* | 8/2014 | Smith | B65B 5/06 |
| | | | 206/522 |
| 2022/0153498 A1* | 5/2022 | Wang | B65D 11/1833 |

* cited by examiner

RECYCLABLE, ENERGY-SAVING AND ENVIRONMENTAL-FRIENDLY PACKING BOX APPLICABLE TO PACKAGING VARIOUS OBJECTS

TECHNICAL FIELD

The technical field relates to a packing box, in particular to a recyclable, energy-saving and environmental-friendly packing box applicable to packaging various objects.

BACKGROUND

With the arrival of Internet era, more and more people buy food or products via online shopping and delivery services. Various paper packing boxes, plastic materials and foam fillers are used in order to deliver these products. Therefore, a lot of trash after the products are delivered, which will in environmental pollution and water a lot of energy. Accordingly, it has become an important issue to provide a recyclable, energy-saving and environmental-friendly packing box applicable to packaging various objects so as to solve the above problems.

SUMMARY

It is a primary objective of the present invention to provide a recyclable, packing box applicable to packaging various objects in order to remedy the deficiencies of prior art. The packing box can be used to package various kinds of objects with different shapes, which can reduce packaging cost, improve environmental pollution and save more packaging time.

To achieve the foregoing objective, the present invention discloses the following technical means:

1. The packing box is formed by a plurality of splicing materials of a standard model. The splicing material on the top of the packing box is provided with an air pump with pressure monitoring function, automatic pumping function and pressure setting function. The inner side of each of the splicing materials is provided with an air bag. The air bags are connected to one another via connection tubes, and can be spliced or separated with one another. The shape of each of the air bags is subject to the outline dimension of a packaged object when the air bags are inflated. The splicing materials can be spliced with one another to form the packing box having the size corresponding to the size of the packaged object, so the packing box is applicable to any objects with different sizes and shapes. The packing box does not need additional fillers and is recyclable, so can satisfy the requirements of logistics and express delivery in Internet era and can reduce the cost of packaging products.
2. As the packing box is formed by the splicing materials of the standard model and the connection tubes are also of the standard model, the process of splicing or separating the splicing materials is simple and efficient. Accordingly, each packing box is recyclable and can be repeatedly used, so using the packing box will not generate additional rubbish, which can effectively satisfy the energy-saving and environmental-friendly requirements.
3. After the splicing materials are spliced to form the packing box, the air bags disposed on the inner sides of the splicing materials are connected to one another by air tubes. Thus, a packaged object with any shapes can be fixed in the packing box after the air bags are inflated, so the packaged object does not tend to be damaged. Besides, the packing box does not need any fillers or other protection devices for fixing the packaged object, which can save packaging materials, such as plastic materials, form fillers, etc., so as to reduce the volume of indecomposable trash and decrease environmental pollution.
4. After the splicing materials are separated from one another, the splicing materials are easy to be recycled and stored. In the commercial application, it is possible to charge some deposits from the users according to the quantity and the size of the splicing materials in order to effectively recycle and reuse the splicing materials. Therefore, the packaging cost can be greatly reduced. In addition, it is not necessary to package the products for several times, so the transportation cost can be decreased.
5. If the pressure of the air bags disposed on the inner sides of the packing box decreases, the air pump with automatic pressure monitoring function can automatically pump up the air bags according to a predetermined pressure in order to make sure that the packaged object will not be damaged.

Further scope of applicability of the present application will become more apparent from the detailed description given hereinafter. However, it should be understood that the detailed description and specific examples, while indicating exemplary embodiments of the disclosure, are given by way of illustration only, since various changes and modifications within the spirit and scope of the disclosure will become apparent to those skilled in the art from this detailed description.

BRIEF DESCRIPTION OF THE DRAWINGS

The disclosure will become more fully understood from the detailed description given herein below and the accompanying drawings which are given by way of illustration only, and thus are not limitative of the disclosure and wherein:

FIG. 1 illustrates that a vertical rechargeable display is disposed in the packing box.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 1:
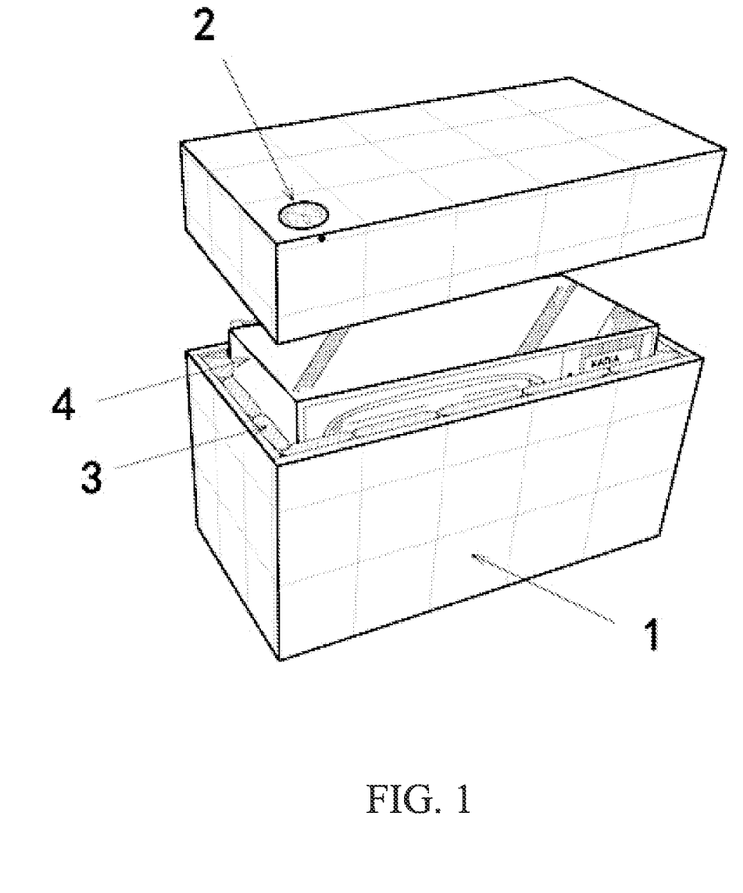
FIG. 1 is a perspective view of a recyclable, energy-saving and environmental-friendly packing box applicable to packaging various objects.

FIG. 1 is a perspective view of a recyclable, energy-saving and environmental-friendly packing box applicable to packaging various objects. The packing box is formed by one or more splicing materials of a standard model. One of the splicing materials on the top of the packing box is provided with an air pump, and the splicing materials on the bottom, the left side, the right side, the front side and the rear side of the packing box have no the air pump.

The reference number (1) stands for the outer side of the splicing material, without the air pump, of the standard model. The reference number (2) stands for the air pump gauge of the splicing material with the air pump. The reference number (3) stands for the inflatable air bag. The reference number (4) stands for the packaged object, a vertical rechargeable display having irregular contours. When the air bags on the inner sides of the packing box are completely inflated, the display is stably fixed in the packing box without shaking. Moreover, the air pump with automatic pumping function can automatically monitor the pressure state of the air bags. If the storage time is too long and the pressure of air bags is less than a predetermined value, the air pump can automatically activate the pumping function in order to increase the pressure of the air bags to the predetermined value. Thus, the packaged object can be stably fixed and will not be damaged during the transportation process.

Figure 2:
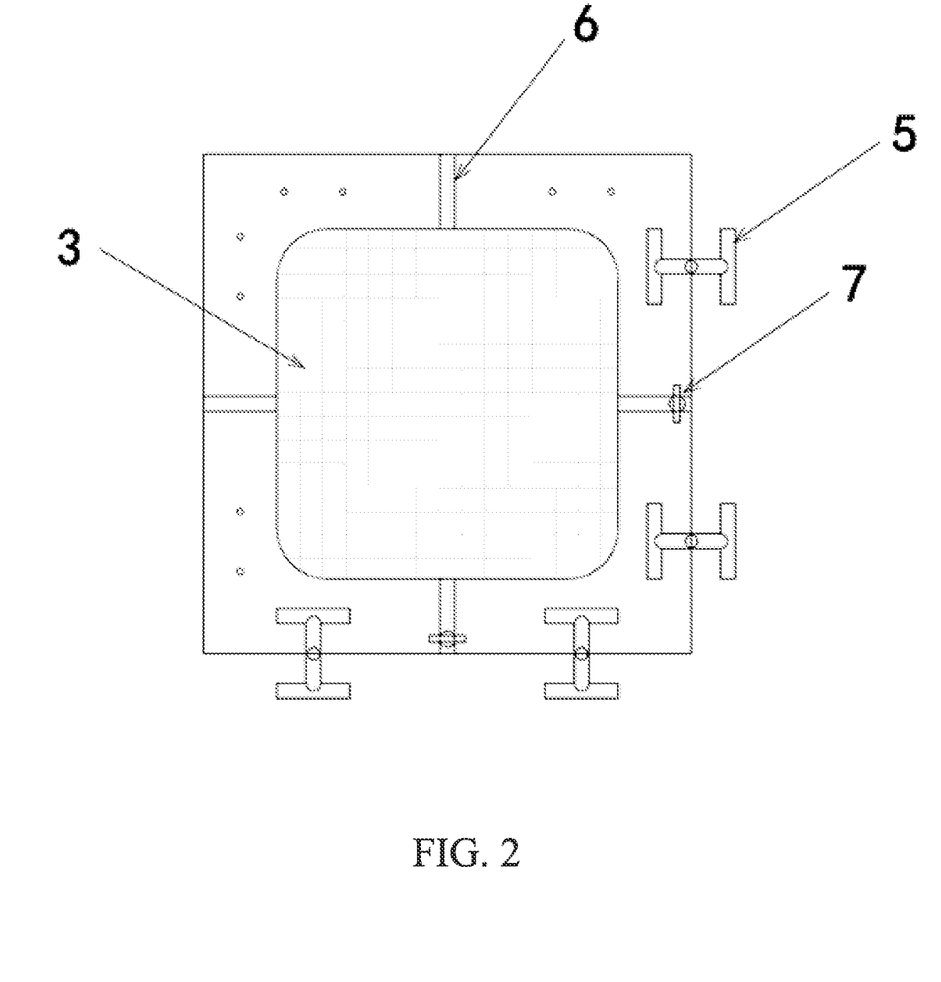
FIG. 2 is a view illustrating the inner side of a splicing material without an air pump.

FIG. 2 is a view illustrating the inner side of the splicing material without the air pump. The reference number (5) stands for the connection device. The reference number (6) stands for the air bag connection tube. The reference number (7) stands for the air bag connection tube valve. When two splicing materials are connected to each other via the connection device and the air bag connection tube valve is opened, the air bags (3) on the two splicing materials are connected to each other.

Figure 3:
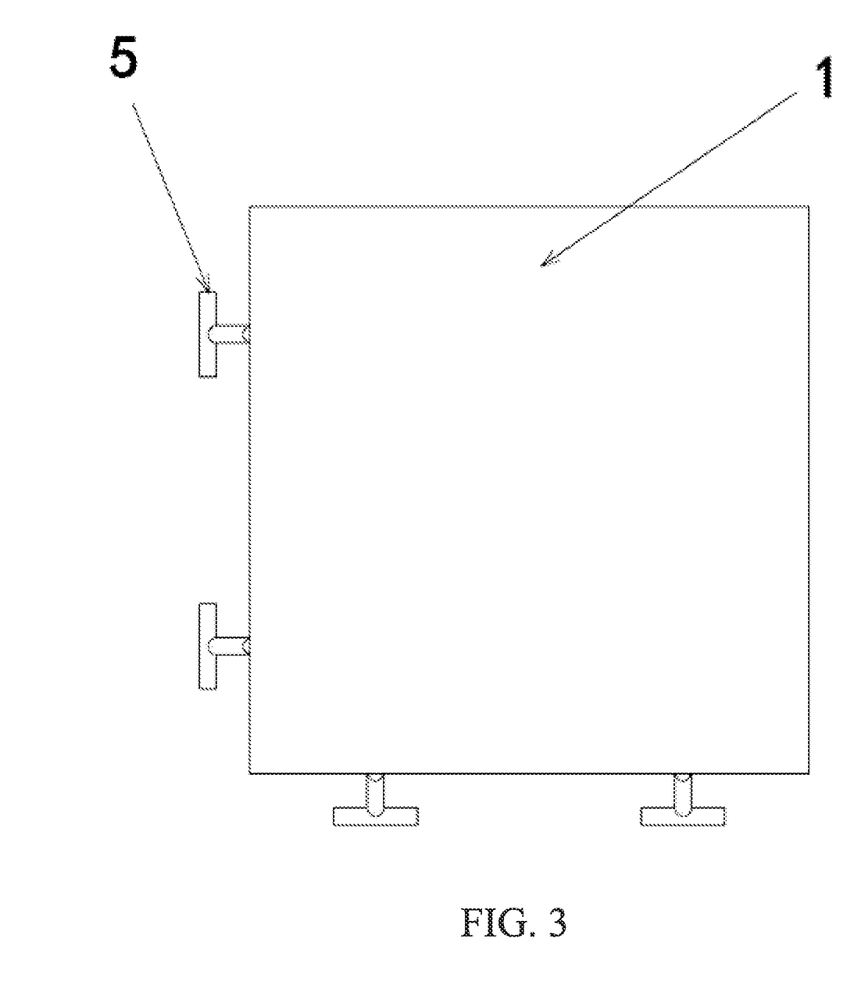
FIG. 3 is a view illustrating the outer side of the splicing material without the air pump.

FIG. 3 is a view illustrating the outer side of the splicing material without the air pump. The reference number (1) stands for the outer side of the splicing material of the standard model. The reference number (5) stands for the connection device.

Figure 4:
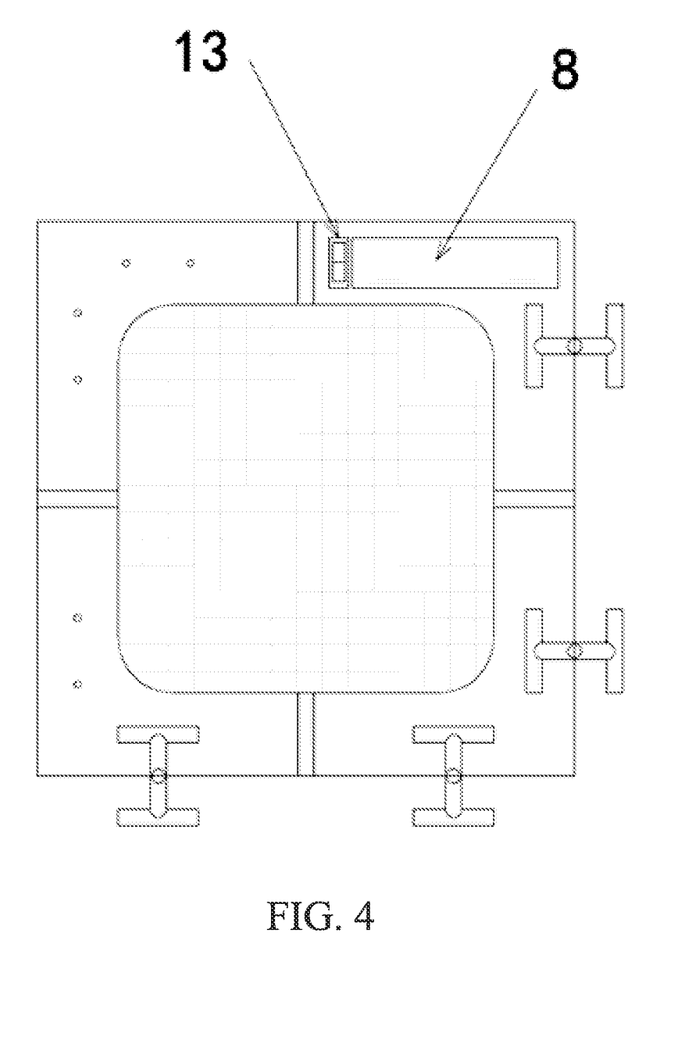
FIG. 4 is a view illustrating the inner side of a splicing material with the air pump and the battery cover thereof being closed.

FIG. 4 is a view illustrating the inner side of the splicing material with the air pump and the battery cover thereof being closed. The reference number (8) stands for the air pump and the battery cover thereof. The reference number (13) stands for the air pump control button.

Figure 5:
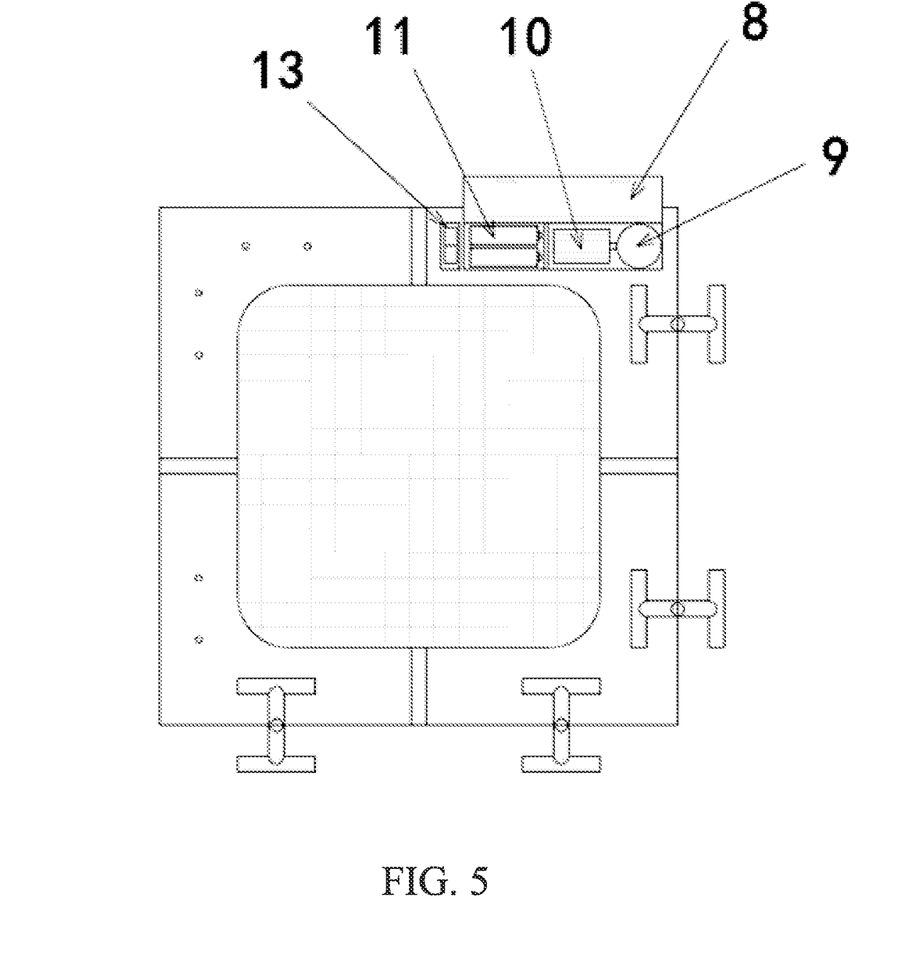
FIG. 5 is a view illustrating the inner side of the splicing material with the air pump and the battery cover thereof being opened.

FIG. 5 is a view illustrating the inner side of the splicing material with the air pump and the battery cover thereof being opened. The reference number (9) stands for the rear side of the air pump gauge. The reference number (10) stands for the air bag pump. The reference number (11) stands for the batter set. When several splicing materials are spliced to one another to form a packing box, the user can open the air bag connection tube valve to make it be parallel to the connection tube, set the desired pressure value and press the air pump control button (13). Then, the air pump can activate the automatic pumping function to increase the pressure of the air bags to the predetermined value in order to completely wrap up and fix the packaged object.

Figure 6:
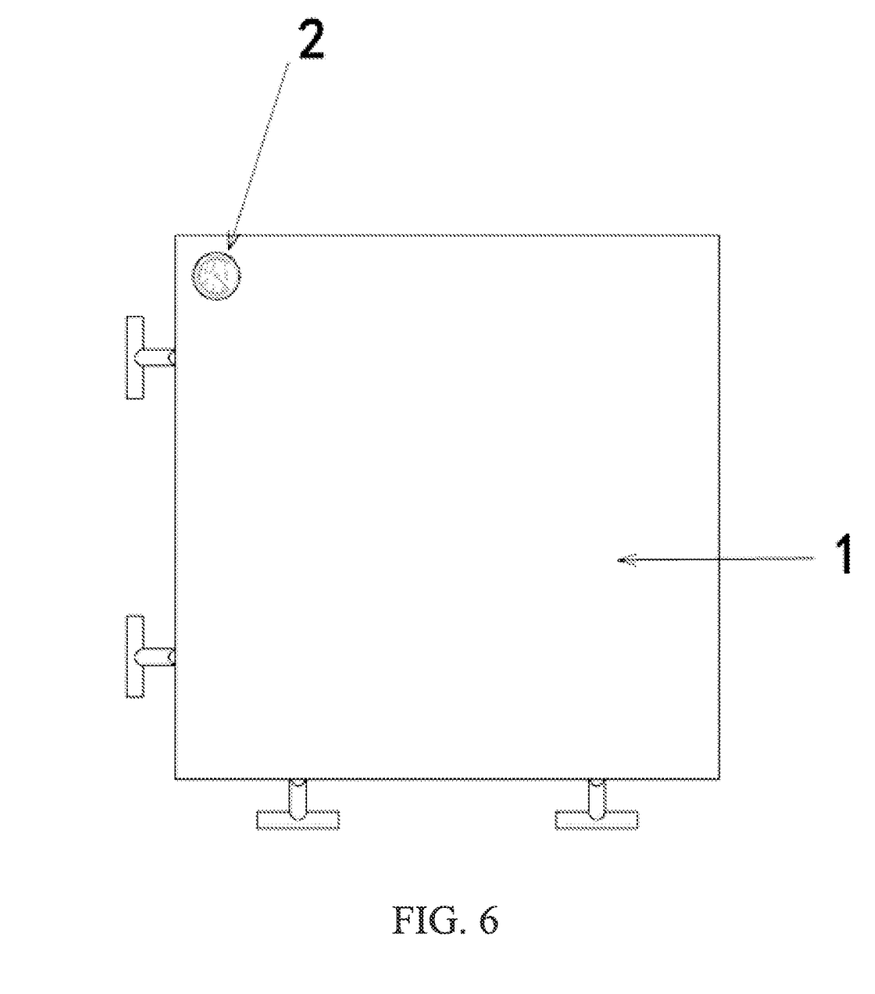
FIG. 6 is a view illustrating the outer side of the splicing material with the air pump.

FIG. 6 is a view illustrating the outer side of the splicing material with the air pump. The reference number (2) stands for the front side of the air pump gauge.

Figure 7:
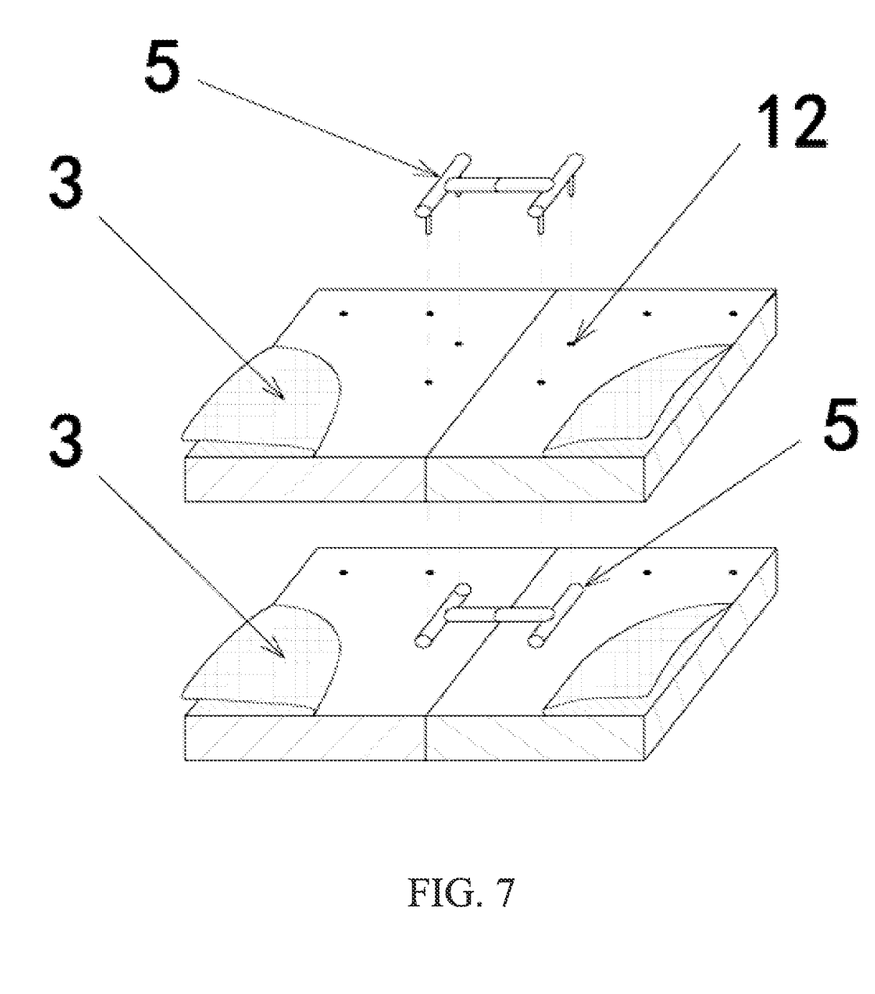
FIG. 7 is a partial enlargement view illustrating two splicing materials parallel to each other being connected by a connection device.

FIG. 7 is a partial enlargement view illustrating two splicing materials parallel to each other being connected by a connection device. The user can put two splicing materials on a plane to make them be parallel to each other and insert the connection device (5) into the holes (12), such that the two splicing materials can be connected to each other. The quantity of the splicing materials can be increased or decreased according to the size of the packaged object so as to make the packing box be able to contain the packaged object.

Figure 8:
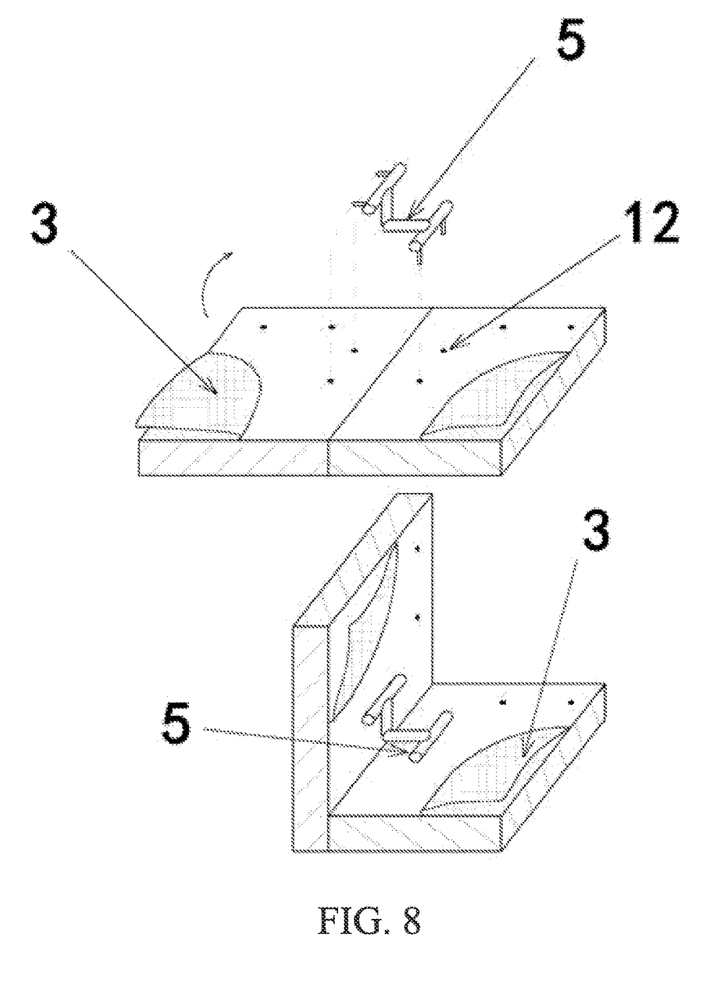
FIG. 8 is a partial enlargement view illustrating two splicing materials vertical to each other being connected by a connection device.

FIG. 8 is a partial enlargement view illustrating two splicing materials vertical to each other being connected by a connection device. When it is necessary to connect two splicing materials vertical to each other, the user can bend the connection device (5) from the middle thereof so as to connect the two splicing materials to each other via the connection device (5).

Figure 9:
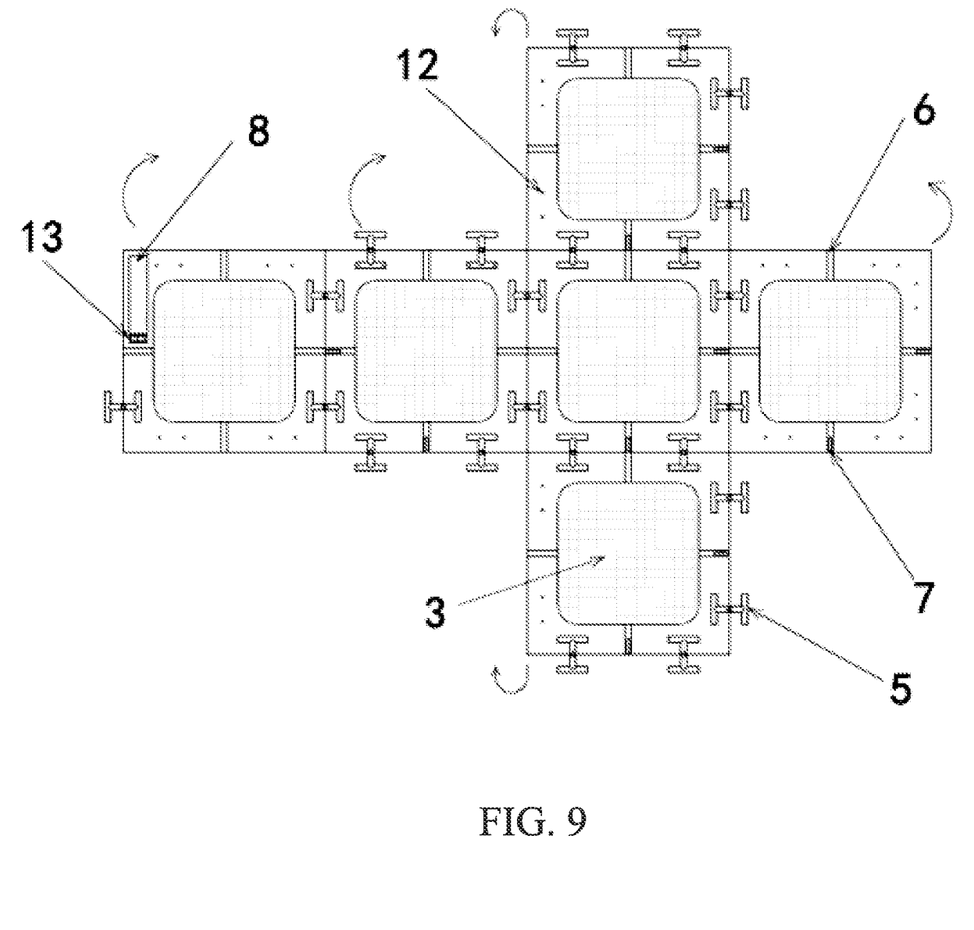
FIG. 9 is a view illustrating six splicing materials being spliced with one another.

FIG. 9 is a view illustrating six splicing materials being spliced with one another. As shown in FIG. 9, six splicing materials are connected to one another according to the size of the packaged object. After the air bag connection tube valve is opened, the air bags on all splicing materials of the packing box are connected to one another and an unfolded square packing box is formed. It is usually to dispose the splicing material with the air pump on the top cover of the packing box with a view to conveniently check the air pump gauge.

Figure 10:
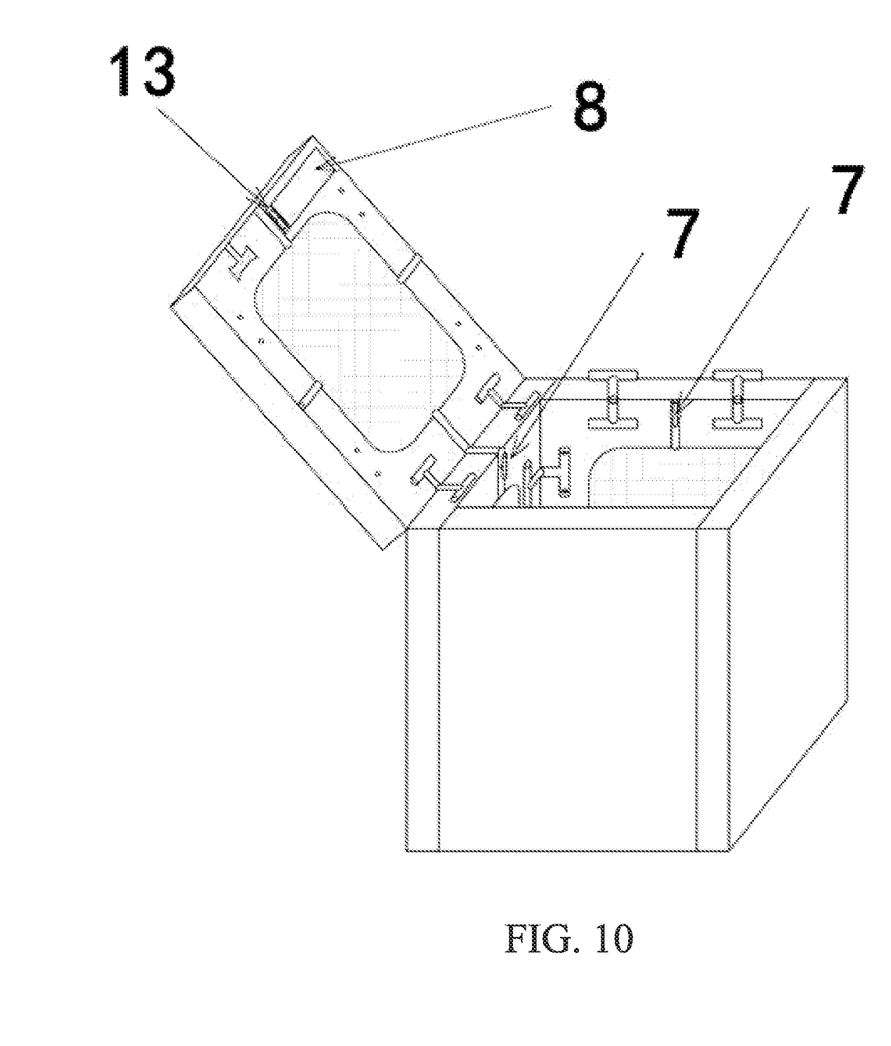
FIG. 10 is a view illustrating a packing box formed by splicing six splicing materials with one another.

FIG. 10 is a view illustrating a packing box formed by splicing six splicing materials with one another. As shown in FIG. 10, six splicing materials are connected to one another to form a square packing box. After the air bag connection tube valve is opened, the air bags on all splicing materials of the packing box are connected to one another. After the user puts the packaged object in the packing box and properly adjust the pressure of the air bags, the user can press the air pump control button (13) to inflate the air bags. Then, the air bags are completely inflated after reaching the predetermined pressure. Finally, the packing box having the packaged object disposed therein is ready to be transported.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A packing box for packaging various objects within, characterized in that the packing box is formed by a plurality of modular faces, the packing box comprising:

wherein the modular face on a top of the packing box is fitted with an air pump having a pressure monitoring function, an automatic pumping function, and a pressure setting function;

wherein an inner side of each of the modular faces is provided with an air bag, and the air bags are inflatable and connected to one another via connection tubes, are interconnected with one another, and a shape of each of the air bags is subject to an outline dimension of a packaged object when the air bags are inflated;

wherein each modular face of the packing box is connected to each other respective adjacent modular face of the packing box by a plurality of respective connection devices, each connection device having a plurality of pins fitting into corresponding holes located at the interior border of the other respective adjacent modular face;

wherein each connection device articulates to allow the respective connection devices to bend when connecting two respective adjacent modular faces.

2. The packing box of claim 1, wherein each of the modular faces are connected to each another to form the packing box to accommodate a size of the packaged object.

3. The packing box of claim 1, wherein when a pressure of the air bags disposed inside the packing box decreases, the air pump with the pressure monitoring function is configured to automatically pump up the air bags according to a predetermined pressure value.

4. A recyclable packing box, comprising:
a plurality of modular faces;
a plurality of connection devices for connecting the plurality of splicing materials;
a plurality of inflatable air bags, wherein an inner side of each modular face is provided with one of the plurality of inflatable air bags, and the plurality of inflatable air bags interconnected via connection tubes, and a shape of each of the air bags is contoured against an outline dimension of a packaged object when inflated; and
an air pump located at the modular face on a top of the packing box, wherein the air pump has a pressure monitoring function, an automatic pumping function, and a pressure setting function, and is configured to supply the plurality of inflatable air bags with pressurized air via the connection tubes;
wherein each modular face of the packing box is connected to each other respective adjacent modular face of the packing box by a plurality of respective connection devices, each connection device having a plurality of pins fitting into corresponding holes located at the interior border of the other respective adjacent modular face;
wherein each connection device articulates to allow the respective connection devices to bend when connecting two respective adjacent modular faces.

5. The recyclable packing box of claim 4, wherein the inflatable air bags are interconnected with one another.

6. The recyclable packing box of claim 5, wherein the inflatable air bags are interconnected with one another via the connection tubes and a set of connection tube valves.

7. The recyclable packing box of claim 4, wherein each of the connection devices is constructed with two T-shape elements.

8. The recyclable packing box of claim 7, wherein each T-shape element comprises a claw formed from the respective plurality of the pins for securely attaching to each modular face.

9. The recyclable packing box of claim 4, further comprising a battery and a control button for operating the air pump.

* * * * *